Patented Dec. 18, 1951

2,578,757

UNITED STATES PATENT OFFICE 2,578,757

2-TERTIARYAMINO-6-(DIALKYLAMINOALKOXY)-BENZOTHIAZOLES AND PROCESS FOR THEIR MANUFACTURE

Norbert Steiger, Nutley, and Oscar Keller, Clifton, N. J., assignors to Hoffmann-La Roche Inc., Nutley, N. J., a corporation of New Jersey No Drawing. Application March 2, 1949, Serial No. 79,316

12 Claims. (Cl. 260—293.4)

The present invention relates to new derivatives of benzothiazoles and to the process for their manufacture. More particularly the invention relates to 2-tertiaryamino-6-(dialkylaminoalkoxy)-benzothiazoles and acid addition salts thereof. The new compounds in the form of the free base can be represented by the following formula:

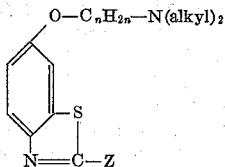

In the above formula, Z stands for a radical of a secondary amine, for example, piperidino, morpholino, and tetrahydroquinolino, and

wherein $R_1$ and $R_2$ may be the same or different and stand for a lower alkyl radical such as methyl, ethyl, propyl, isopropyl, butyl, isobutyl, tertiary-butyl, amyl, isoamyl, and the like; an aryl radical, as for example, phenyl, or an aralkyl radical, such as benzyl. The letter $n$ stands for a number from 2-5, and the group $C_nH_{2n}$ includes alkylene, branched alkylene, and alkylidene radicals.

The new compounds are characterized by their activity against fungi, more particularly against pathogenic and plant fungi.

According to the present invention, the 2-tertiaryamino - 6 - (dialkylaminoalkoxy) - benzothiazoles can be prepared by reacting a 2-tertiaryamino-6-hydroxybenzothiazole in the form of its alkali metal salts, as for example, the sodium, potassium or lithium salts, with a dialkylaminoalkyl halide, as for example, a dialkylaminoethane chloride, dialkylaminopropane chloride, dialkylaminobutane chloride, dialkylaminoheptane chloride, 2-chloro-1-dialkylamino-propane, 1-chloro-2,2-dimethyl-3-dialkylamino - propane, and the like. The reaction is preferably carried out in the presence of an organic solvent or diluent, as for example, chlorbenzene, toluene, xylene, and the like. The 2-tertiaryamino-6-(dialkylaminoalkoxy)-benzothiazole can be recovered from the reaction medium as the free base by removing the organic solvent; or as the acid addition salts thereof, for example, as the hydrochloride or hydrobromide, by passing HCl or HBr into the reaction medium. The free bases are oils, soluble in the usual organic solvents, insoluble in water, but soluble in dilute acids. The hydrochlorides are soluble in water, methanol and ethanol.

The free bases readily yield acid addition salts with both organic and inorganic acids. Thus, by treating the bases with an equivalent amount of an acid, as for example, hydrochloric, hydrobromic, sulfuric, phosphoric, nitric, acetic, propionic, caprylic, undecylenic, tartaric, and citric acids, the corresponding acid addition salts of the 2-tertiaryamino - 6 - (dialkylaminoalkoxy) - benzothiazoles are obtained.

PREPARATION OF 2-TERTIARYAMINO-6-HYDROXY-BENZOTHIAZOLES

The 2-tertiaryamino-6-hydroxy-benzothiazoles employed as starting materials can be readily prepared from the corresponding 2-tertiaryamino-6-alkoxy-benzothiazoles by hydrolysis with aqueous hydrobromide solution or with aluminum chloride in a suitable solvent, such as chlorbenzene.

The method of preparing the 2-tertiaryamino-6-hydroxy-benzothiazoles is illustrated by the following examples:

EXAMPLE A

*6-hydroxy-2-morpholyl-benzothiazole*

66 grams of 6-ethoxy-2-morpholyl-benzothiazole were suspended in 375 cc. of chlorbenzene, and 70 grams of aluminum chloride were added in portions with stirring. The mixture was then refluxed at 130–135° C. for three hours. The chlorbenzene layer was decanted and the thick residue was decomposed with ice. 15 cc. of concentrated (37 per cent) hydrochloric acid were added, the chlorbenzene was returned to the reaction vessel and the whole was steam distilled. The aqueous residue was cooled at 4° C., whereupon a precipitate was obtained. This was purified by dissolving in hot water and reprecipitated with sodium acetate to obtain the 6-hydroxy-2-morpholyl-benzothiazole which on crystallization from aqueous alcohol had a M. P. of 192–194° C.

EXAMPLE B

*6-hydroxy-2-(1,2,3,4-tetrahydroquinolyl)-benzothiazole*

19 grams of 6-ethoxy-2(1,2,3,4 - tetrahydroquinolyl)-benzothiazole were suspended in 150 cc. of chlorbenzene, and 20 grams of aluminum chloride were added in portions. The mixture was refluxed at 130–135° C. for four hours. The chlorbenzene was decanted and the residue was decomposed with ice and 20 cc. of concentrated hydrochloric acid. The chlorbenzene was returned to the reaction vessel and the whole was steam distilled. The aqueous residue was treated with 100 grams of sodium chloride and cooled at 4° C. The yellow precipitate was filtered off, dissolved in dilute alkali and reprecipitated with hydrochloric acid and sodium acetate, to yield the above-entitled benzothiazole, which on crystallization from alcohol had a M. P. of 218–220° C.

The 6-ethoxy-2-(1,2,3,4-tetrahydroquinolyl)-benzothiazole was prepared in the following manner:

19.5 grams of p-ethoxy-phenyl-isothiocyanate were condensed with 14 grams of 1,2,3,4-tetrahydroquinoline in 100 cc. of ligroin by refluxing on a steam bath for three hours. The 1-(p-ethoxy-phenyl-thiocarbamyl)-1,2,3,4-tetrahydroquinoline formed was brominated with 16 grams of bromine in 125 cc. of chloroform by refluxing for three hours on a steam bath. After distilling off the solvent, the hydrobromide of 6-ethoxy-2-(1,2,3,4-tetrahydroquinolyl)-benzothiazole thus obtained was crystallized from alcohol, M. P. 208–210° C. The hydrobromide was converted to the free base by dissolving it in hot dilute hydrochloric acid and precipitating with solid sodium acetate. Crystallized from ethanol the free base had a M. P. of 143–145° C.

EXAMPLE C

*6-hydroxy-2-dibutylamino-benzothiazole*

36 grams of 6-ethoxy-2-dibutylamino-benzothiazole were suspended in 200 cc. of chlorbenzene, and 34 grams of aluminum chloride were added in portions. The mixture was refluxed at 130–135° C. for four hours. After cooling, the mixture was slowly added to 25 cc. of concentrated hydrochloric acid and ice with cooling. The chlorbenzene was steam distilled and the aqueous residue was treated with 200 grams of sodium chloride. After cooling at 4° C., the solid was dissolved in dilute alkali, the solution acidified with hydrochloric acid and treated with sodium acetate to precipitate the free base. The product was crystallized from aqueous alcohol.

EXAMPLE D

*6-hydroxy-2-dimethylamino-benzothiazole*

30 grams of 6-ethoxy-2-dimethylamino-benzothiazole were heated with 300 cc. of 48 per cent hydrobromic acid on a steam bath under reflux for 24 hours. The reaction mixture while still hot was diluted with 1,000 cc. of water. The solution was made alkaline to phenolphthalein with 40 per cent sodium hydroxide and after stirring for ½ hour was filtered with charcoal. The filtrate was made acid to congo with concentrated hydrochloric acid and cooled at 4° C. The crystalline solid that separated was filtered off, washed with ice water and dried at room temperature in vacuo. The 6-hydroxy-2-dimethylamino-benzothiazole hydrobromide thus obtained on crystallizing from alcohol had a M. P. of 245–246° C.

By sludging the hydrobromide with an excess of sodium acetate solution to 60° C. until congo indicator no longer showed a bluish stain, and filtering followed by drying the residue, there was obtained the free base of 6-hydroxy-2-dimethylamino-benzothiazole.

EXAMPLE E

*6-hydroxy-2-piperidyl-benzothiazole*

By employing 93 grams of 6-ethoxy-2-piperidyl-benzothiazole and 100 grams of aluminum chloride and proceeding as in Example A, there was obtained 6-hydroxy-2-piperidyl-benzothiazole, M. P. 217–219° C.

EXAMPLE F

*6-hydroxy-2-methylphenylamino-benzothiazole*

By employing 30 grams of 6-ethoxy-2-methylphenylamino-benzothiazole and 32 grams of aluminum chloride, and proceeding as in Example A, there was obtained 6-hydroxy-2-methylphenylamino-benzothiazole, M. P. 171–174° C.

The 6-ethoxy-2-methylphenylamino-benzothiazole was prepared in the following manner:

54 grams of p-ethoxy-phenyl-isothiocyanate were condensed with 36 grams of methyl aniline in 200 cc. of ligroin by refluxing on a steam bath. The p-ethoxy-phenyl-methylphenyl-thiourea which formed was obtained by concentrating the reaction mixture, then diluting with ether.

75.5 grams of the thiourea were brominated with 24 grams of bromine in 350 cc. of chloroform by refluxing on a steam bath for four hours. After distilling off the solvent, the residue obtained was diluted with ether. The 6-ethoxy-2-methylphenylamino-benzothiazole-hydrobromide thus obtained had a M. P. of 184–186° C. when crystallized from ethanol-ether.

The hydrobromide was converted to the free base by extraction with dilute hydrochloric acid and precipitating with sodium acetate. The free base on crystallization from ethanol had a M. P. of 118–120° C.

EXAMPLE G

*6-hydroxy-2-methylbenzylamino-benzothiazole*

By employing 25 grams of 6-ethoxy-methylbenzylamino-benzothiazole and 100 cc. of 48 per cent hydrobromic acid and proceeding as in Example D, there was obtained 6-hydroxy-2-methylbenzylamino-benzothiazole, M. P. 169° C.

The 6-ethoxy-2-methylbenzylamino-benzothiazole was obtained in the following manner:

141 grams of 6-ethoxy-benzothiazole-2-sodium sulfonate were condensed with 200 grams of methylbenzylamine in 500 cc. of alcohol and 225 cc. of water, in the presence of 30 grams of zinc chloride in a closed vessel at 135° C. On the dilution of the reaction mixture with water, 6-ethoxy-2-methylbenzylamino-benzothiazole was obtained. On crystallization from aqueous ethanol, it had a M. P. of 76–80° C.

PREPARATION OF 2-TERTIARYAMINO-6-(DIALKYLAMINOALKOXY)-BENZOTHIAZOLES

The following examples will serve to ilustrate the preparation of the 2-tertiaryamino-6-(dialkylaminoalkoxy)-benzothiazoles.

EXAMPLE 1

*2-dimethylamino-6-(β-diethylaminoethoxy)-benzothiazole dihydrochloride*

19.4 grams of 2-dimethylamino-6-hydroxy-benzothiazole (M. P. 245° C.) were sludged in a 500 cc. three-necked flask with 250 cc. of chlorbenzene. Then 4.4 grams of sodium hydroxide flakes were added and the mixture heated with agitation to 90° C. 4 cc. of water were dropped in, and the mixture then heated slowly to the boil while about 500 cc. of the water-containing chlorbenzene were distilled off. 50 cc. of dry chlorbenzene were then added and the distillation was continued until about 30 cc. of the chlorbenzene were distilled off. The residue was the sodium salt of thiazole in chlorbenzene. To the residue were added at 90° C., 15 grams of fresh distilled 1-diethylamino-2-chloro-ethane. The mixture was then refluxed at 133° C. for three hours, then cooled to 35° C. 75 cc. of water and 5 cc. of (40 per cent by volume) sodium hydroxide solution were added and the mixture stirred for one hour. The chlorbenezene layer which contained the reaction product was separated from the aqueous layer in a separatory funnel. The chlorbenzene solution was then dried with sodium sulfate for twelve hours. It was then filtered and HCl gas was passed into the chlorbenzene solution until saturated, while cooling and stirring. The dihydrochloride precipitated as a white crystalline, sandy powder. The precipitate was filtered and washed on the funnel with benzene and finally washed with ether. The filter cake was dried at 80–90° C. The 2-dimethylamino-6-(β-diethylaminoethoxy)-benzothiazole dihydrochloride thus obtained is a white crystalline powder, M. P. 240–243° C. It can be recrystallized from ethanol and ether, or methanol or acetone.

The free base, which is an oil, can be obtained from the aqueous solution of the dihydrochloride by adding dilute sodium hydroxide or sodium carbonate solution. The base is soluble in ether, methanol, ethanol, benzene and the like, but slightly soluble in water.

EXAMPLE 2

*2-dimethylamino-6-(β-dimethylaminoethoxy)-benzothiazole dihydrochloride*

10 grams of 2-dimethylamino-6-hydroxy-benzothiazole were sludged with 200 cc. of chlorbenzene and 2.3 grams of sodium hydroxide flakes. 2 cc. of water were added at 90° C. and the whole was subjected to azeotropic distillation. In this manner the dry sodium salt of 2-dimethylamino-6-hydroxy-benzothiazole was obtained. All of the salt thus formed was reacted with seven grams of 1-dimethylamino-2-chloroethane in the same manner as described in Example 1. There was obtained the dihydrochloride of 2-dimethylamino-6-(β-dimethylaminoethoxy)-benzothiazole in the form of white, sandy crystals, M. P. 228–231° C., when crystallized from methanol and acetone. The dihydrochloride is very soluble in water, soluble in ethanol and methanol, but insoluble in acetone.

EXAMPLE 3

*2-dimethylamino-6-(β-dimethylamino-iso-propoxy)-benzothiazole dihydrochloride*

All of the sodium salt, made in the same way as described in Example 2 from 10 grams of 2-dimethylamino-6-hydroxy-benzothiazole and 2.3 grams of sodium hydroxide flakes in 200 cc. of chlorbenzene, was reacted with seven grams of 2-chloro-1-dimethylamino-propane for three hours at 130–133° C. in the same manner as described in Example 1. The 2-dimethylamino-6-(β-dimethylamino-isopropoxy)-benzothiazole dihydrochloride obtained formed white crystals, M. P. 124° C. when crystallized from ethanol and acetone. It was very soluble in water and soluble in ethanol and methanol. The free base can be obtained by treating the dihydrochloride with dilute sodium hydroxide or sodium carbonate solution.

EXAMPLE 4

*2-dimethylamino-6-(3'-diethylamino-2',2'-dimethyl-propoxy)-benzothiazole dihydrochloride*

All of the dry sodium salt made from 10 grams of 2-dimethylamino-6-hydroxy-benzothiazole, and 2.3 grams of sodium hydroxide in 200 cc. of chlorbenzene, as described in Example 2, was reacted with 8 grams of 1-chloro-2,2-dimethyl-3-diethylamino-propane at 133° C. for four hours in the same manner as described in Example 1. The 2-dimethylamino-6-(3'-diethylamino-2',2'-dimethyl-propoxy)-benzothiazole dihydrochloride obtained formed white crystals, M. P. 131–133° C. when crystallized from methanol and acetone. It is very soluble in water, methanol, and ethanol, but insoluble in acetone.

EXAMPLE 5

*2-dibutylamino-6-(β-diethylaminoethoxy)-benzothiazole dihydrochloride*

11.2 grams of 2-dibutylamino-6-hydroxy-benzothiazole, 1.75 grams of sodium hydroxide, 2 cc. of water and 175 cc. of chlorbenzene were reacted as described in Example 1. All of the sodium salt of the thiazole thus formed was condensed with seven grams of 1-diethylamino-2-chloro-ethane and the condensation product was isolated with HCl gas as the above-entitled dihydrochloride, in the manner described in Example 1. The compound has a M. P. 105° C. It is very soluble in water and alcohol.

EXAMPLE 6

*2-(4-morpholyl)-6-(β-diethylaminoethoxy)-benzothiazole*

10 grams of 6-hydroxy-2-morpholyl-benzothiazole, 1.9 grams of sodium hydroxide flakes, 2 cc. of water and 200 cc. of xylene were heated to the boil and 50 cc. of xylene-water mixture were distilled off. The residue containing the sodium salt of the thiazole in xylene was reacted with 7.5 grams of 1-diethylamino-2-chloroethane for three hours at 130° C. The xylene was distilled off with steam. The residue from the steam distillation was crystallized from methanol, yielding the free base of the above-entitled compound, M. P. 76° C. It forms a hydrochloride which is very soluble in water and alcohol.

EXAMPLE 7

*2-(1-piperidyl)-6-(β-diethylaminoethoxy)-benzothiazole*

10 grams of 6-hydroxy-2-piperidyl-benzothiazole, 1.94 grams of sodium hydroxide flakes, 2 cc. of water and 200 cc. of chlorbenzene were heated to the boil, and 50 cc. of chlorbenzene and water mixture were distilled off. The residue was the sodium salt of the thiazole in chlorbenzene. Seven grams of 1-diethylamino-2-chloro-ethane were then added to the residue at 80° C. and the mixture refluxed for three hours. The chlorbenzene was removed by steam distillation. The residue was crystallized from methanol. It formed white needles, M. P. 68° C. The compound is very soluble in dilute hydrochloric acid, forming the hydrochloride of the above-entitled compound.

EXAMPLE 8

*2-tetrahydroquinolyl-6-(β-diethylaminoethoxy)-benzothiazole dihydrochloride*

In the manner described in Example 1, 8.5 grams of 6 - hydroxy - 2 - tetrahydroquinolyl-benzothiazole, 1.35 grams of sodium hydroxide, 1.5 cc. of water, and 200 cc. of chlorbenzene were reacted to form the sodium salt of the thiazole, and all of the salt formed was reacted with 4.5 grams of 1-diethylamino-2-chloro-ethane. The condensation product was isolated as a white crystalline powder in the form of the above-entitled dihydrochloride, and when recrystallized from methanol and ether, had a M. P. of 150° C. with decomposition. It is soluble in water and alcohol.

EXAMPLE 9

2 - methylphenylamino - 6 - (β - dimethylaminoethoxy) -benzothiazole monohydrochloride In the same manner as described in Example 1, 11 grams of 6-hydroxy-2-methylphenylaminobenzothiazole, 1.35 grams of sodium hydroxide flakes, 2 cc. of water, and 200 cc. of chlorbenzene were reacted to form the sodium salt of the thiazole, and all of the salt formed was reacted with 9 grams of 1-diethylamino-2-chloro-ethane. The condensation product was isolated as the above-entitled hydrochloride, M. P. 161° C. When recrystallized from methanol and ether, it formed white crystals which were soluble in water and alcohol.

EXAMPLE 10

2 - benzylmethylamino - 6 - (β - diethylaminoethoxy) -benzothiazole dihydrochloride Following the procedure of Example 1, 11 grams of 6-hydroxy-2-benzylmethylaminobenzothiazole, 1.8 grams of sodium hydroxide flakes, 2 cc. of water and 200 cc. of chlorbenzene were reacted to form the sodium salt of the thiazole, and all of the salt formed was reacted with 1-diethylamino-2-chloro-ethane. The condensation product was isolated with hydrogen chloride. The above-entitled compound thus obtained is a crystalline grayish powder very soluble in water, which when recrystallized from methanol and acetone has a M. P. of 116° C.

In the above Examples 1–10, potassium hydroxide or lithium hydroxide can be employed instead of sodium hydroxide to form the corresponding alkali metal salt of the 6-hydroxy-2-tertiaryamino-benzothiazoles, and these alkali salts reacted to form the 2-tertiaryamino-6-(dialkylaminoalkoxy)-benzothiazoles, in the same manner as described in the examples.

The following examples will illustrate the preparation of acid addition salts of the 2-tertiaryamino-6 - (dialkylaminoalkoxy) - benzothiazoles with organic acids.

EXAMPLE 11

Dipropionate of 2-dimethylamino-6-(β-diethylaminoethoxy) -benzothiazole

To 29.3 grams of 2-dimethylamino-6-(β-diethylaminoethoxy)-benzothiazole were added at room temperature 15 grams of propionic acid. A clear almost colorless syrup was formed. This was the dipropionate of 2-dimethylamino-6-(β-diethylaminoethoxy)-benzothiazole. The salt is soluble in water, alcohol and glycerine.

EXAMPLE 12

Dicaprylate of 2-dimethylamino-6-(β-diethylaminoethoxy) -benzothiazole

To 29.3 grams of 2-dimethylamino-6-(β-diethylaminoethoxy)-benzothiazole were added at room temperature 29 grams of caprylic acid, whereupon the dicaprylate was formed as a syrup which is very soluble in alcohol, but only slightly soluble in water.

EXAMPLE 13

Diundecylenate of 2-dimethylamino-6-(β-diethylaminoethoxy) -benzothiazole

To 29.3 grams of 2-dimethylamino-6-(β-diethylaminoethoxy)-benzothiazole were added at room temperature 36.8 grams of undecylenic acid, whereupon the undecylenic salt was formed as a syrup. The salt is soluble in 80 per cent alcohol.

Mixed salts can also be obtained. Thus when to 29.3 grams of 2-dimethylamino-6-(β-diethylaminoethoxy)-benzothiazole were added 7.5 grams of propionic acid and 18.4 grams of undecylenic acid, there was obtained as an oil the 2-dimethylamino - 6 - (β - diethylaminoethoxy) - benzothiazole propionate-undecylenate.

We claim:

1. A compound of the class consisting of a 2-tertiaryamino - 6-(dialkylaminoalkoxy)-benzothiazole, which in the form of its free base, can be represented by the following formula:

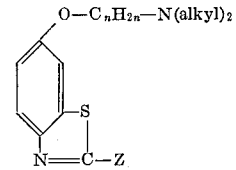

wherein Z is a member of the group consisting of a piperidino, morpholino, tetrahydroquinolino and

radical, $R_1$ and $R_2$ being members of the group consisting of lower alkyl, phenyl and benzyl radicals, and the N atom of the Z group is attached to the 2-position of the benzothiazyl nucleus, and $C_nH_{2n}$ is a member of the group consisting of alkylene, branched alkylene and alkylidene radicals wherein $n$ stands for an integer from 2–5, and the acid addition salts thereof.

2. The process which comprises reacting an alkali metal salt of a 2-tertiaryamino-6-hydroxybenzothiazole which can be represented by the following formula:

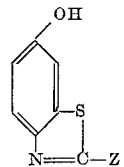

with a dialkylaminoalkyl halide which can be represented by the following formula

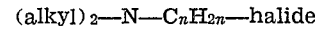

wherein Z is a member of the group consisting of a piperidino, morpholino, tetrahydroquinolino and

radical, $R_1$ and $R_2$ being members of the group consisting of lower alkyl, phenyl and benzyl radicals, and the N atom of the Z group is attached to the 2-position of the benzothiazyl nucleus, and $C_nH_{2n}$ is a member of the group consisting of alkylene, branched alkylene and alkylidene radicals wherein $n$ stands for an integer from 2–5.

3. The process according to claim 2 where the dialkylaminoalkyl halide is a dialkylaminoalkyl chloride.

4. 2-tetrahydroquinolyl - 6 - ($\beta$ - diethylaminoethoxy)-benzothiazole.

5. 2-dimethylamino - 6 - ($\beta$-dimethylaminoethoxy)-benzothiazole.

6. 2-(1-piperidyl)-6-($\beta$ - diethylaminoethoxy)-benzothiazole.

7. The process which comprises reacting 6-hydroxy-2-tetrahydroquinolyl-benzothiazole sodium salt with 1-diethylamino-2-chloro-ethane so as to produce 2-tetrahydroquinolyl-6-($\beta$-diethylaminoethoxy)-benzothiazole.

8. The process which comprises reacting 2-dimethylamino - 6 - hydroxy-benzothiazole sodium salt with 1-dimethylamino-2-chloro-ethane so as to produce 2-dimethylamino - 6 - ($\beta$-dimethylaminoethoxy)-benzothiazole.

9. The process which comprises reacting 6-hydroxy-2-piperidyl-benzothiazole sodium salt with 1-diethylamino-2-chloro-ethane so as to produce 2-(1-piperidyl)-6-($\beta$ - diethylaminoethoxy)-benzothiazole.

10. 2-dimethylamino - 6 - ($\beta$-diethylaminoethoxy)-benzothiazole.

11. 2-dimethylamino - 6 - ($\beta$-diethylaminoethoxy)-benzothiazole dihydrochloride.

12. The process which comprises reacting 2-dimethylamino-6-hydroxy - benzothiazole sodium salt with 1-chloro-2-diethylamino-ethane so as to form 2-dimethylamino-6-($\beta$ - diethylaminoethoxy)-benzothiazole.

NORBERT STEIGER.
OSCAR KELLER.

REFERENCES CITED

The following references are of record in the file of this patent:

FOREIGN PATENTS

| Number | Country | Date |
|---|---|---|
| 306,590 | Great Britain | Feb. 25, 1929 |
| 154,655 | Switzerland | Aug. 1, 1932 |